United States Patent
Timm et al.

(10) Patent No.: US 9,637,219 B2
(45) Date of Patent: May 2, 2017

(54) FAIRING TRANSITION AND VEHICLE WITH A MOVABLE BODY AND A FIXED BODY COMPRISING A FAIRING TRANSITION

(75) Inventors: Sascha Timm, Buxtehude (DE); Gerd Stahl, Wolgast/Mahlzow (DE); Uwe Henning, Hollern/Twielenfleth (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 556 days.

(21) Appl. No.: 13/420,047

(22) Filed: Mar. 14, 2012

(65) Prior Publication Data

US 2012/0234975 A1    Sep. 20, 2012

Related U.S. Application Data

(60) Provisional application No. 61/452,476, filed on Mar. 14, 2011.

(30) Foreign Application Priority Data

Mar. 14, 2011  (DE) .................. 10 2011 013 828

(51) Int. Cl.
| | | |
|---|---|---|
| *B64C 7/00* | (2006.01) | |
| *B64C 9/16* | (2006.01) | |
| *B64C 9/22* | (2006.01) | |
| *F16B 5/06* | (2006.01) | |

(52) U.S. Cl.
CPC .................. *B64C 7/00* (2013.01); *B64C 9/16* (2013.01); *B64C 9/22* (2013.01); *F16B 5/0621* (2013.01)

(58) Field of Classification Search
CPC ..... B64C 7/00; B64C 9/16; B64C 9/22; F16B 5/0621

USPC ........ 244/45 R, 46, 118.2, 119, 130; 441/74; 296/180
See application file for complete search history.

(56) References Cited

U.S. PATENT DOCUMENTS

| | | | | |
|---|---|---|---|---|
| 2,581,625 | A * | 1/1952 | Brady ........................ | 244/129.1 |
| 2,841,344 | A * | 7/1958 | Stroukoff .................... | 244/208 |
| 3,425,740 | A * | 2/1969 | De Vaughn .................. | 296/163 |
| 4,285,482 | A * | 8/1981 | Lewis ....................... | B64C 9/22 244/207 |
| 5,031,836 | A * | 7/1991 | Ward ....................... | 239/265.19 |
| 8,544,176 | B2 * | 10/2013 | Delort ...................... | 29/897.32 |

(Continued)

FOREIGN PATENT DOCUMENTS

| | | |
|---|---|---|
| DE | 102004032682 A1 | 10/2005 |
| WO | 2009136949 A1 | 11/2009 |

OTHER PUBLICATIONS

German Patent and Trade Mark Office, German Office Action for German Patent Application No. 10 2011 013 828.5, mailed Mar. 13, 2013.

*Primary Examiner* — Valentina Xavier
(74) *Attorney, Agent, or Firm* — Lorenz & Kopf, LLC

(57) ABSTRACT

A fairing transition is provided for covering a gap between a movable body and a fixed body on a vehicle that includes, but is not limited to a base plate that is attachable to a vehicle, a cover plate that is attachable to the base plate. The base plate and the cover plate include, but are not limited to a correspondingly formed connecting profile having positive fit on surfaces that face each other, with the connecting profile configured to slide the cover plate onto the base plate. Furthermore, the cover plate is lockable to the base plate in an end position.

12 Claims, 4 Drawing Sheets

(56) References Cited

U.S. PATENT DOCUMENTS

2004/0124311 A1* 7/2004 Kordel et al. ............... 244/131
2007/0145638 A9* 6/2007 Mead ...................... 264/272.15
2008/0121758 A1* 5/2008 Hernandez ................ 244/130
2012/0068016 A1* 3/2012 Sauermann ................ 244/130
2012/0104792 A1* 5/2012 Smith et al. ............... 296/180.4

* cited by examiner

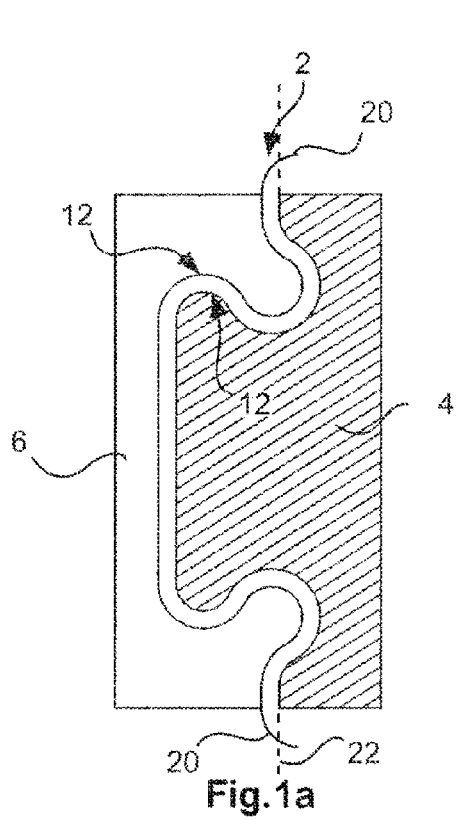
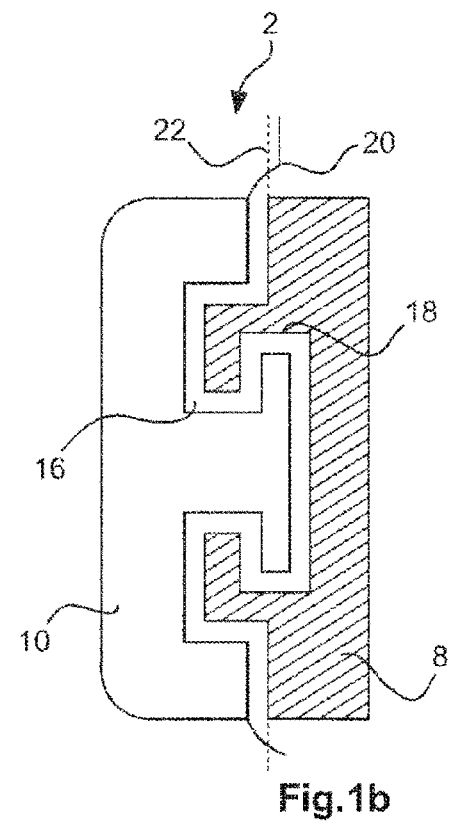
Fig.1a
Fig.1b
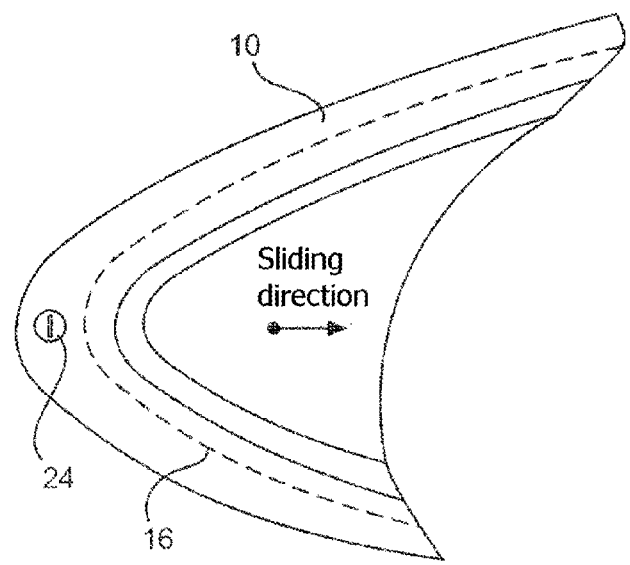
Fig.2a
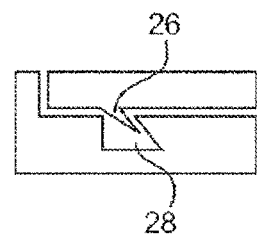
Fig.2b

FAIRING TRANSITION AND VEHICLE WITH A MOVABLE BODY AND A FIXED BODY COMPRISING A FAIRING TRANSITION

CROSS-REFERENCE TO RELATED APPLICATIONS

This application claims priority to German Patent Application No. 10 2011 013 828.5 filed Mar. 14, 2011 and also claims priority to U.S. Provisional Patent Application No. 61/452,476 filed Mar. 14, 2011, which are incorporated herein by reference in their entirety.

TECHNICAL FIELD

The technical field relates to a fairing transition for covering a gap between a movable body and a fixed body on a vehicle, and further relates to a vehicle with a movable body and a fixed body as well as with a fairing transition.

BACKGROUND

Usually there is a gap between a movable body and a fixed body, which bodies regularly carry out a movement relative to each other, which gap prevents rubbing between, or collision of, the two bodies. For example, commercial aircraft regularly comprise a number of control flaps to carry out flight control tasks, which control flaps can be moved relative to fixed structures, for example the fuselage or the wings, in order to influence the management of forces of the aircraft in a desired manner. At the same time, for cruise flight of an aircraft it is particularly important to achieve the lowest possible drag coefficient so that smooth surfaces in the region of control surfaces and their transition to fixed structures are preferred in the retracted state.

A secondary flight control system of a commercial aircraft, for example a high-lift system, often comprises high-lift flaps or slats or similar bodies that can carry out a very distinct movement relative to a fuselage or a wing of the aircraft. A leading-edge flap that is movably arranged on a wing and that is also known as "slat" can, for example, be moved in at least one spatial direction relative to the respective wing and to the adjacent aircraft fuselage without adjacent structural components being damaged. For this purpose a gap is implemented between an end surface, which faces the fuselage, of the leading-edge slat, which gap should completely disappear in the retracted state of the leading-edge slat, thus providing a smooth and even surface. This is made possible by a fairing transition in a wing root, also referred to as a "root fillet".

Such a fairing transition is essentially implemented as a plate-shaped component with a base plate and an elastic cover plate, which plates are attached to the fuselage of an aircraft by means of several screws with the use of a sealant that needs drying. In an aircraft of the series AIRBUS A 320 fastening takes place on a fairing component arranged near a wing root, which fairing component is sometimes referred to as a "BAE panel," in a position adjacent to an end surface of a leading-edge slat. Subsequently, the heads of the screws are closed with a sealant. Normally the fairing transition is produced separately of the structure to which it is to be attached, with holes being made in said fairing transition.

With such a design of fairing transitions it may happen that the hole pattern of the fairing transition frequently does not correlate with the hole pattern at the point where it is to be installed. Consequently, the screws used for attachment are difficult or even impossible to insert. Furthermore, the gap dimensions present between the surface of the place of installation and the fairing transition are often incorrect after installation; during subsequent deinstallation of the fairing transition the heads of the screws are frequently damaged and the entire fairing transition is deformed, and consequently new components are required. An additional difficulty is presented by the additional drying time, usually several hours, of the sealant, when new components need to be installed.

It is thus at least one object to provide a fairing transition for integration in the transition region between a fixed body and a movable body having a fairing transition that, if at all possible, has no, or very little, adjustment work so that the installation time is short, there is no need for rework, and the expenditure is significantly limited. In addition, other objects, desirable features and characteristics will become apparent from the subsequent summary and detailed description, and the appended claims, taken in conjunction with the accompanying drawings and this background.

SUMMARY

The fairing transition according to an embodiment comprises a base plate that is attachable to a vehicle. Furthermore, a cover plate is provided that is attachable to the base plate. For this purpose the base plate and the cover plate comprise corresponding a connecting profile having positive fit on surfaces facing each other. The connecting profile is adapted such that the cover plate is slidable onto the base plate, and in an end position lockable to the base plate.

The cover plate can be realized by an elastic rubber-like material or some other suitable materials mixture so that, by taking advantage of the elasticity, flush closing of a gap in an end position can be achieved. The design of the material of the base plate can be selected independently of this and should be as lightweight as possible, in particular when used on an aircraft. Not only light metals can be considered for this, but also thermoplastics and elastomers, which ideally allow some elasticity in the integration on a component, for example on a region of an aircraft, which region is adjacent to a leading-edge slat.

When compared to a known holding arrangement of a fairing transition, the installation times are reduced, among other things because there are no longer any screw connections involved. In addition, there is no longer any time-consuming adjustment of the fairing transition, a process which in prior art usually takes approximately one hour. In addition, because there are no longer any screw connections involved, there is also no longer any sealing of the heads of the screws, and consequently, for example in the use on an aircraft for sealing the gap between a leading-edge slat and a fuselage structure, a leading-edge slat may be operated immediately rather than after the sealant has had several hours of curing time. This represents a very significant advantage in the manufacturing process of a vehicle, for example an aircraft, as well as in the maintenance thereof.

The shortened installation time, furthermore, makes it possible for the fairing transition according to the invention to be installed only after the vehicle has been painted, so that the masking work previously associated with the fairing transition also no longer applies.

In an embodiment the base plate comprises a material from a group of materials comprising light metal, thermoplastics and elastomers. Simple processability and a light-weight construction have an advantageous effect on its suitability in an aircraft.

In an embodiment the base plate is designed to be laminated on or to the vehicle. This may, for example, be implemented by a suitable connecting surface that can be placed under a matrix material and fiber material layer. Consequently, the base plate forms an integral component of the vehicle.

In an embodiment the base plate can comprise holes that make it possible to screw the base plate to the vehicle. This involves, in particular, countersunk holes, which ensure good introduction of force from screw-type devices to the vehicle.

In order to save sealing the fairing transition, in an embodiment the normally used sealant is replaced by a circumferential rubber lip. In its installed state this rubber lip should be designed to ensure a complete seal between the cover plate and the structure to which the fairing transition is to be affixed, and to this effect said rubber lip may be arranged either on the base plate or on the cover plate. By means of the rubber lip any ingress of humidity between the cover plate, the base plate and underneath the base plate can be prevented.

In an embodiment the connecting profile having positive fit comprise at least one undercut so that the cover plate is slidable onto the base plate only in one sliding direction, and with the connecting profile engaged not being removable from the base plate in a direction transverse to the sliding direction. The undercut can be implemented in the form of a profile set back from a cutout arranged on a surface, which profile is designed in a dovetail-like manner. Consequently the cover plate can be undone in an end position, in a snapped-in or in some other way locked state, only by releasing the locking device from the base plate.

Locking can take place with a securing screw. The cover plate can comprise a hole for receiving a securing screw that can be connected to the base plate, for the purpose of securing the position of the cover plate on the base plate. The base plate need not necessarily comprise a thread, for example in the form of a slidable nut, for receiving the securing screw; as an alternative the cover plate can also be jammed to the base plate with a grub screw. To the average person skilled in the art the use of further securing screws will, of course, be self-evident.

As an alternative or in addition, locking the cover plate onto the base plate can take place with the use of an arrangement of a snap-in device, which arrangement comprises an indentation, an undercut or an opening in which a latch, a lug or some other snap-in element comes against an end stop. Furthermore, the arrangement of snap-in device can comprise a locking body that is slidably held within the base plate in a hole and that is forced by a spring to move into a corresponding receiving hole of the cover plate so that when the holes are aligned after the cover plate has been slid on, the locking body thus automatically snaps into the hole. When pressure is exerted on the locking body the latter can be undone. The arrangement of snap-in device can also comprise a quick-release fastener.

BRIEF DESCRIPTION OF THE DRAWINGS

Further characteristics, advantages and application options of embodiments are disclosed in the following detailed description with figures. The described and/or illustrated characteristics per se and in any combination form the embodiments of the invention, even irrespective of their composition in the individual claims or their interrelationships. Furthermore, identical or similar components in the figures have the same reference characters where:

FIG. 1a and FIG. 1b show a fairing transition according to an embodiment with two differently designed connecting profile;

FIG. 2a to FIG. 2g show a cover plate and a snap-in device for the cover plate.

DETAILED DESCRIPTION

Figure 2C:
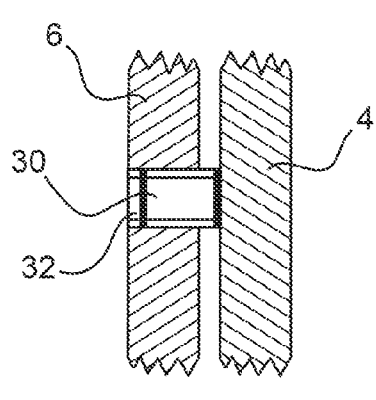

The following detailed description is merely exemplary in nature and is not intended to limit application and uses. Furthermore, there is no intention to be bound by any theory presented in the preceding background or summary or the following detailed description.

FIG. 1a and FIG. 1b show a fairing transition 2 according to an embodiment with a base plate 4 and a cover plate 6 (FIG. 1a) or a base plate 8 and a cover plate 10 (FIG. 1b). Both variants show dovetail-like connecting profile 12 and 14 or 16 and 18, which by means of indentations and protrusions are formed so as to correspond to each other. These connecting profiles 12, 14 and 16, 18 are provide a connection having positive fit, and in each case comprise at least one undercut so that the cover plate 6 or 10 can be moved only in the direction of extension of the indentations or protrusions. This prevents accidental lifting of the cover plate 6, 10 from the base plate in a slid-on state.

As an example, FIG. 1b shows a rubber lip 20 on the cover plate 10, which rubber lip 20 establishes a seal between the cover plate 10 and a structure (shown by hatched lines 22) of a vehicle. To this effect the base plate 8 can be laminated into this vehicle structure or can be integrated in some other way so that the base plate 8 forms an integral component of the vehicle.

FIG. 2a shows a top view of a cover plate 10 in its installed state, with the connecting profile 16 shown by a dashed line. In order to lock the cover plate 10 to the base plate 8 a snap-in mechanism 24 can be used, which in the case shown is, for example, designed as a securing screw. As an alternative, FIG. 2b shows a locking catch 26 that can engage a correspondingly formed locking aperture 28. Undoing may be achieved by way of a tool that lifts the locking catch 26, which tool may be inserted into a gap or opening provided for this purpose.

Figure 2D:
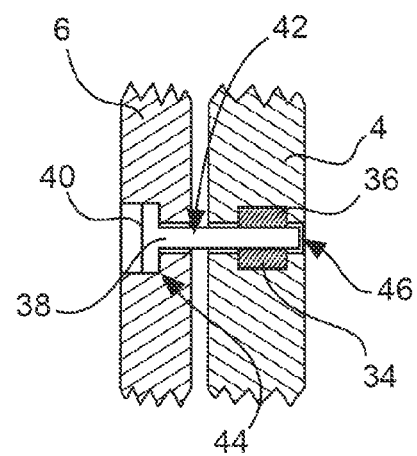

FIG. 2c shows a grub screw 30 that is screwed into a threaded hole 32 of the cover plate 6 and establishes a frictional connection between the cover plate 6 and the base plate 4 so as to prevent the cover plate 6 from sliding out. The grub screw 30 is preferably designed in such a manner that only a small indentation arises in the surface of the cover plate 6, which surface points away from the base plate 4. FIG. 2d shows a nut 36 that is slidably guided in the base plate 4 in a channel-like indentation 34, into which nut 36 a screw 38 can be screwed in order to secure the cover plate 6 to the base plate. As an alternative, instead of using a screw 38 it is also possible to use a screw rivet so that the nut 36 is then designed as a nut plate.

As a result of the slidability of the nut 36, clamping or jamming the nut 36 can be prevented because purely axial introduction of force is possible. The screw 38 preferably comprises a screw head 40 whose diameter is greater than the diameter of a shank 42 so that the screw 38 can rest against a correspondingly formed recess 44 of the cover plate 6. The channel-like indentation 34 should comprise a cutout 46 that points away from the cover plate 6, which cutout 46 makes it possible for the end of the screw 38, which end points away from the head 40, to penetrate the nut 36 in order to prevent clamping of the nut 36.

Figure 2E:
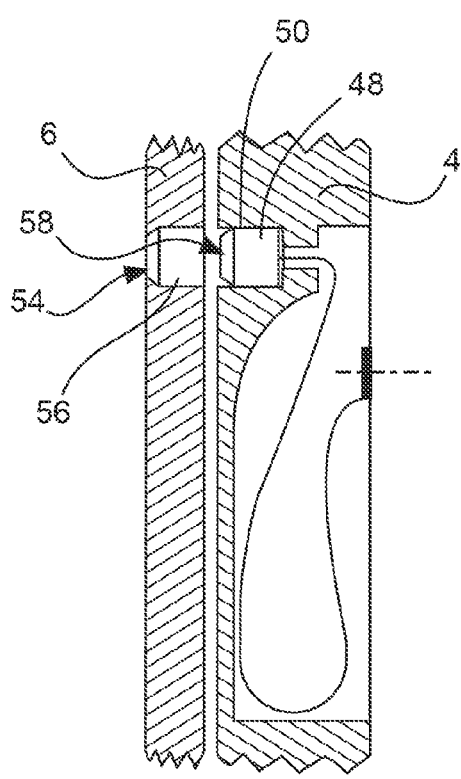

FIG. 2e shows a locking body 48 that is slidably held within the base plate 4 in a hole 50 and with a loop-like spring 52 that is under tension, which spring 52 comprises an elastic material, for example a flat spring steel or a plastic suitable for this purpose, is forced into a corresponding hole 56 of the cover plate, which hole 56 comprises a recess 54. When the holes 50 and 56 are aligned after the cover plate 6 has been slid onto the base plate 4 the locking body 48 thus automatically snaps into the hole 56 and with the recess 54 is protected against full penetration of the hole 56. Preferably, the locking body 48 and the recess 54 are designed in such a manner that as flat a surface as possible is provided on the side of the cover plate, which side faces away from the base plate 4. By manually pushing against the surface 58 of the locking body 48, which surface passes through the cover plate 6, the locking body 48 can be forced from the hole 56 to the base plate 4 in order to undo the locking action and undo the cover plate 6 by sliding it from the base plate 4.

Figure 2F:
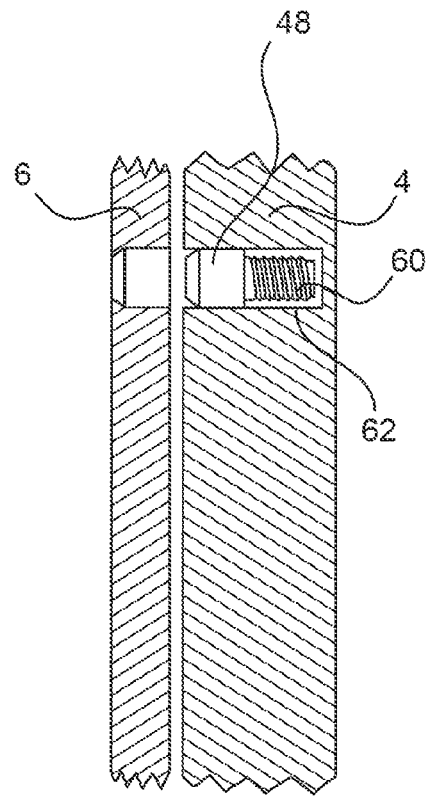

FIG. 2f shows a variant that differs slightly from the previous one. In this illustration the locking body 48 is forced into the hole 56 by a coil spring 60 with a circular cross section. In this arrangement the coil spring 60 is arranged in a retaining hole 62 that is preferably designed as a blind hole.

Figure 2G:
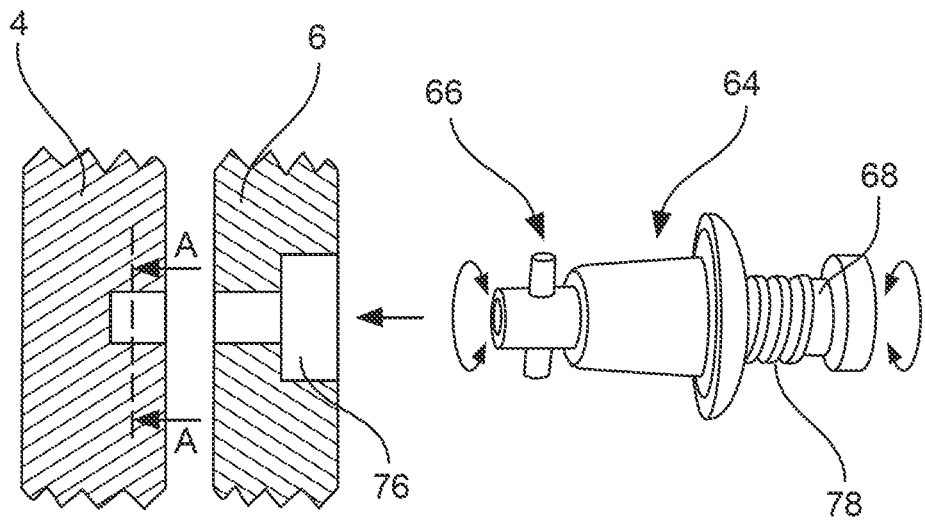
Figure 2G:
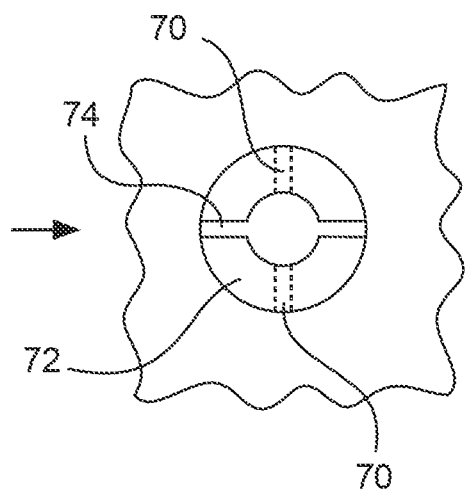

FIG. 2g shows a quick-release fastener 64 comprising, for example, two pivotally held latches 66 that are arranged so as to be offset from each other by approximately 180° above an operating body 68, which as an example is designed as a screw shank with a screw head, which latches 66 can snap into corresponding indentations 70 that follow on in an undercutting manner from an opening 72. The latches 66 are designed as pin-like projections. To this effect the latches 66 will be inserted, through insertion openings 74 that are arranged so as to be offset with the indentations 70, into the base plate 4 until by being rotated they reach into the undercut indentations 70. To this effect the operating body is inserted in a receiving aperture 76 of the cover plate and is pushed against the tension of a coil spring 78 in the direction of the base plate 4 before being inserted with rotation of the operating body, into the indentations 70 where they are held by resting flush against a return force of the spring 78.

Figure 3:
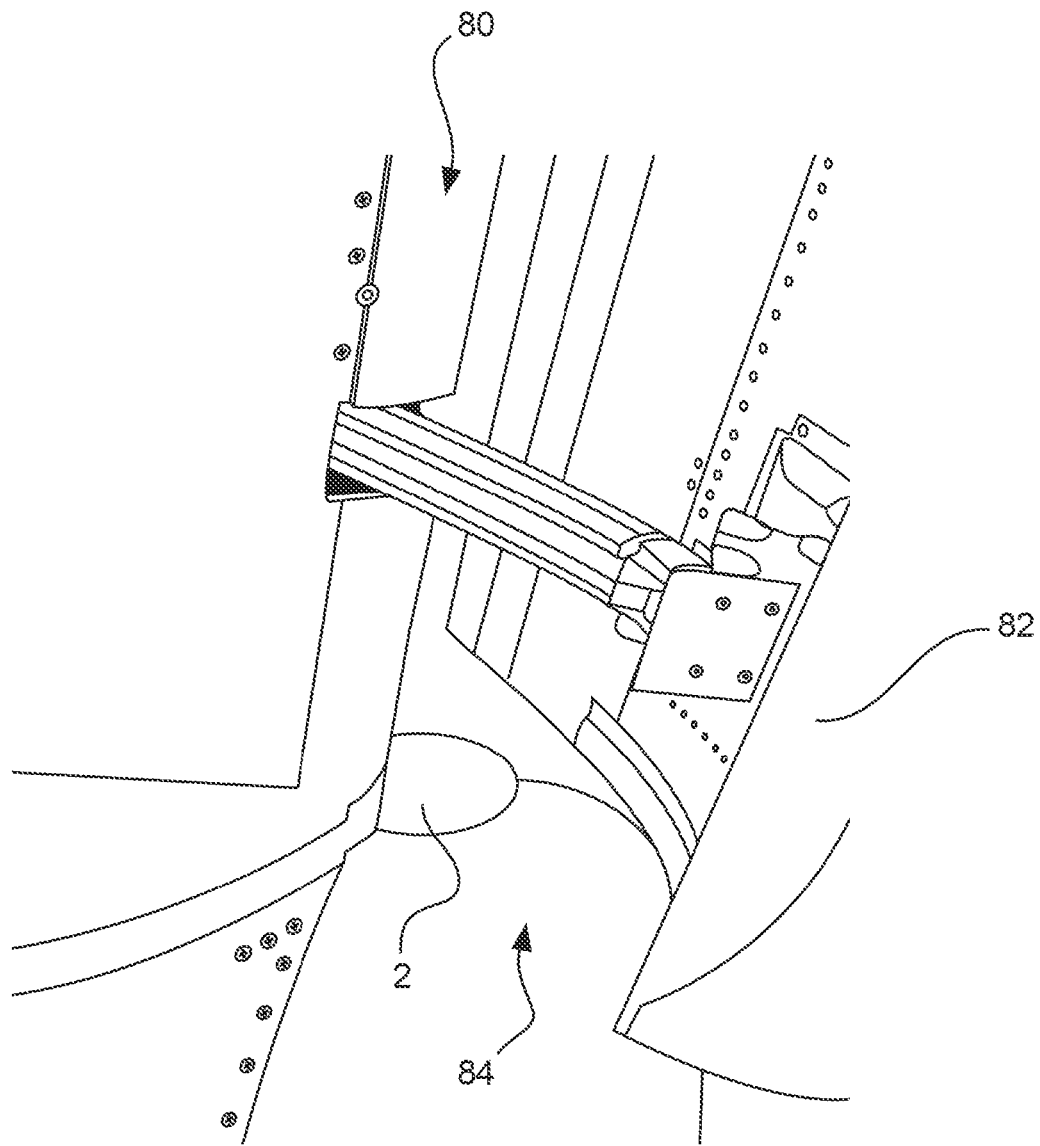
FIG. 3 shows a detailed view of an aircraft with a fairing transition arranged thereon.

Finally, FIG. 3 shows a section of a three-dimensional view of an aircraft 80 on which a leading-edge slat 82 is arranged and is movably held relative to an adjacent aircraft structure 84 in a wing root region. The fairing transition 2 is able to seal the gap between the leading-edge slat 82 and the structure 84 in a retracted position of the leading-edge slat 82.

It should be pointed out that "comprising" does not exclude other elements or steps, and "a" or "an" does not exclude a plural number. Furthermore, it should be pointed out that characteristics which have been described with reference to one of the above exemplary embodiments can also be used in combination with other characteristics of other exemplary embodiments described above. In addition, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fairing transition for covering a gap between a moveable body and a fixed body on a vehicle, comprising:
    a base plate that is configured for attachment to one of the moveable body and the fixed body of the vehicle;
    a cover plate that is configured for attachment to the base plate; and
    connecting profiles for the base plate and the cover plate that are shaped to correspond with each other and having a positive fit on surfaces that face each other, the connecting profiles are configured to enable the cover plate to slide onto the base plate,
    wherein the cover plate is lockable to the base plate in an end position;
    wherein the connecting profiles comprises an undercut that is configured to limit the slide of the cover plate onto the base plate in only one sliding direction, and with the connecting profiles engaged not removable from the base plate transverse to the only one sliding direction;
    wherein the cover plate comprises an elastic rubber-like material;
    a material of the base plate comprises a light metal; and
    wherein the fairing transition is dimensioned to seal a gap between a leading-edge slate and a fuselage structure of the vehicle.

2. The fairing transition of claim 1, a material of the base plate comprises a thermoplastic.

3. The fairing transition of claim 1, a material of the base plate comprises an elastomer.

4. The fairing transition of claim 1, further comprising a circumferential rubber lip that is configured to seal the cover plate from a structure of the vehicle.

5. The fairing transition of claim 1, wherein the base plate is laminated to the vehicle.

6. The fairing transition of claim 1, wherein the base plate comprises a plurality of apertures that are configured to establish screw connections to the vehicle.

7. The fairing transition of claim 1, wherein the cover plate comprises an aperture that is configured to receive a securing screw that is connectable to the base plate.

8. The fairing transition of claim 1, wherein the base plate and the cover plate comprise a snap-in device that is configured to snap the cover plate to the base plate.

9. A vehicle, comprising:
    a movable body;
    a fixed body;
    a gap between the movable body and the fixed body; and
    a fairing transition that is configured to cover the gap between the movable body and the fixed body, the fairing transition comprising:
        a base plate;
        a cover plate that is configured for attachment to the base plate; and
        connecting profiles for the base plate and the cover plate that are shaped to correspond with each other and having a positive fit on surfaces that face each other, the connecting profiles are configured to enable the cover plate to slide onto the base plate,
        wherein the cover plate is lockable to the base plate in an end position;

wherein the connecting profiles comprises an undercut that is configured to limit the slide of the cover plate onto the base plate in only one sliding direction, and with the connecting profiles engaged not removable from the base plate transverse to the only one sliding direction;

wherein the base plate comprises a light metal and is attachable to one of the fixed body and the moveable body;

wherein the cover plate comprises an elastic rubber-like material; and wherein the fairing transition is dimensioned to seal a gap between a leading-edge slate and a fuselage structure of the vehicle.

10. The vehicle of claim 9, wherein the vehicle is an aircraft.

11. The vehicle of claim 9, wherein the movable body is a control surface of an aircraft.

12. The vehicle of claim 9, further comprising a circumferential rubber lip that is configured to seal the cover plate from a structure of the vehicle.

\* \* \* \* \*